(12) United States Patent
Cho

(10) Patent No.: US 8,153,259 B2
(45) Date of Patent: Apr. 10, 2012

(54) CERAMIC SHEET PRODUCT AND METHOD OF MANUFACTURING THE SAME

(75) Inventor: Beom Joon Cho, Gyunggi-do (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 1030 days.

(21) Appl. No.: 11/892,710

(22) Filed: Aug. 27, 2007

(65) Prior Publication Data

US 2008/0057329 A1    Mar. 6, 2008

(30) Foreign Application Priority Data

Aug. 31, 2006  (KR) ........................ 10-2006-0083270

(51) Int. Cl.
*B32B 9/04* (2006.01)
*B32B 27/00* (2006.01)
*B32B 23/04* (2006.01)

(52) U.S. Cl. ...................... 428/411.1; 428/500; 428/532

(58) Field of Classification Search .................. None
See application file for complete search history.

(56) References Cited

U.S. PATENT DOCUMENTS

| 2,966,719 | A | 1/1961 | Park, Jr. | |
|---|---|---|---|---|
| 2002/0164469 | A1 * | 11/2002 | Hanai | ........................... 428/210 |

FOREIGN PATENT DOCUMENTS

| JP | 11-026289 | 1/1999 |
|---|---|---|
| JP | 2000-351946 | 12/2000 |
| JP | 2001-185439 | 7/2001 |
| JP | 2004-319998 | 11/2004 |
| JP | 2006-156202 | 6/2006 |
| KR | 10-2005-0058668 | 6/2005 |

OTHER PUBLICATIONS

Japanese Office Action, w/ English translation thereof, issued in Japanese Patent Application No. JP 2007-226937 dated Jul. 27, 2010.
Japanese Office Action, with English translation, issued in Japanese Patent Application No. 2007-226937, mailed Apr. 5, 2011.
Taiwanese Examination Report, w/ English translation thereof, issued in Taiwanese Patent Application No. TW 096131773 dated Sep. 7, 2011.

* cited by examiner

*Primary Examiner* — Sheeba Ahmed

(74) *Attorney, Agent, or Firm* — McDermott Will & Emery LLP

(57) ABSTRACT

There is provided a ceramic sheet product having a binder layer separately formed in a lower portion thereof to increase stackability and to reduce generation of pores after binder burnout, and a method thereof. The ceramic sheet product includes a binder layer formed of a binder resin; and a ceramic green sheet form on the binder layer. This reduces an amount of high polymer binder in a ceramic slurry, increasing a ceramic powder fraction. Due to such a high density of the green sheet, the number of pores formed after the binder burnout is very small, which decreases volume shrinkage and increases density.

5 Claims, 8 Drawing Sheets

CERAMIC SHEET PRODUCT AND METHOD OF MANUFACTURING THE SAME

CLAIM OF PRIORITY

This application claims the benefit of Korean Patent Application No. 2006-0083270 filed on Aug. 31, 2006, in the Korean Intellectual Property Office, the disclosure of which is incorporated herein by reference.

BACKGROUND OF THE INVENTION

1. Field of the Invention

The present invention relates to a ceramic sheet product and a method of manufacturing the same, and more particularly, to a ceramic sheet product having a binder layer separately formed in a lower portion thereof to increase stackability and minimizing pores in a ceramic sheet after binder burnout, and a method of manufacturing the same.

2. Description of the Related Art

In the field of wireless communication, small-sized ceramic sheet products having various functions and usable in radio frequency bands are employed lately. The ceramic sheet products are manufactured by a low temperature cofired ceramic (LTCC) process which involves stacking and firing at a low temperature.

FIG. 1 is a diagram illustrating a general LTCC process.

First, a slurry 1 is prepared by mixing a ceramic powder, an organic binder, and a dispersing agent in a solvent. Then the mixed slurry 1 is applied on a plastic film 2 such as a Mylar (a trademark owned by Dupont Teijin Films) film to cast each ceramic green sheet 3, and the cast ceramic green sheet 3 is cut into a desired size.

Then, the plurality of ceramic green sheets 3 are compressed at a low pressure into one layer 4.

Next, one of a circuit pattern and an electrode is printed on the one layer 4 made up of the plurality of ceramic green sheets 3. The layers 4a to 4c each with one of the circuit pattern and the electrode printed thereon are stacked and compressed into one bar 5. The bar 5 is cut into chips 6, which are then fired at a low temperature (about 850° C.) to eliminate organic substances thereof including the binder and to densify the structure.

In the slurry prepared as described above, the binder is a highpolymer with a molecule amount of about 30,000 to 80,000, and supports bonding between the substances to maintain a shape and mechanical strength of the green sheets. Also, in order for the binder to be uniformly dispersed among particles of ceramic powder, a process of pulverizing and mixing is applied only to the ceramic powder, the dispersing agent and the solvent for a long time in advance.

However, the high polymer binder with relatively high viscosity tends to degrade the dispersibility of substances in the slurry, eventually causing uneven dispersibility of the binder because of the ceramic powder and other substances in the solvent. This results in a non-uniform distribution of the binder in the green sheet. That is, stable rearrangement of the particles of the ceramic powder is hampered by the high polymer of high viscosity during a drying process for forming the green sheet.

In order to obtain uniform dispersibility of substances in the slurry and maintain viscosity of the slurry, the type and composition of the solvent for achieving a maximum solubility is determined according to the type of binder chosen. That is, once the binder is determined, the type of solvent is limited in selection, and therefore it is impossible to consider an optimal solvent for other substances including the dispersing agent. In other words, it is less likely to select an optimal solvent for all the substances in the slurry.

In particular, when the green sheets are stacked, inter-layer bonding is generated by the binder, and an insufficient amount of binder may result in inadequate inter-layer bonding. Conversely, too large an amount of binder may increase the number of pores after firing, which in turn decreases sinterability. Furthermore, even if a suitable amount of binder is used, spaces once occupied by the binder among the particles of ceramic powder remain as pores after firing. Therefore, the resultant structure should be densified by shrinkage during firing, but a greater number of pores makes it more difficult to accurately control shrinkage of the stacked structure.

SUMMARY OF THE INVENTION

An aspect of the present invention provides a ceramic green sheet product having a binder layer separately formed in a lower portion thereof to increase stackability and minimizing pores in a ceramic sheet after firing, and to a method of manufacturing the same.

According to an aspect of the invention, there is provided a ceramic sheet product including: a binder layer formed of a binder resin; and a ceramic green sheet form on the binder layer.

The binder resin may be at least one selected from a group consisting of a vinyl resin, a cellulose resin and an acrylic resin, and the ceramic green sheet may have a packing ratio of 75% or more.

According to another aspect of the invention, there is provided a method of manufacturing a ceramic sheet product, the method including: forming a binder layer by applying a binder solution, in which a binder resin and a solvent are mixed, on a plastic film and drying the binder solution; and forming a ceramic green sheet by applying and drying a ceramic slurry on the binder layer.

The method may further include removing the plastic film from the binder layer, after forming a ceramic green sheet, and the ceramic green sheet may have a packing ratio of 75% or more.

The ceramic slurry may be prepared by mixing a mixture comprising a ceramic powder and the binder resin, in a solvent, the mixture including 90 to 99.5 wt % of the ceramic powder and 0.5 to 10 wt % of the binder resin with respect to a total weight thereof. The mixture may further include a dispersing agent.

The mixture may include 95 to 99 wt % of the ceramic powder and 1 to 5 wt % of the binder resin with respect to a total weight thereof.

The binder resin may be at least one selected from a group consisting of a vinyl resin, a cellulose resin and an acrylic resin.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Figure 1:
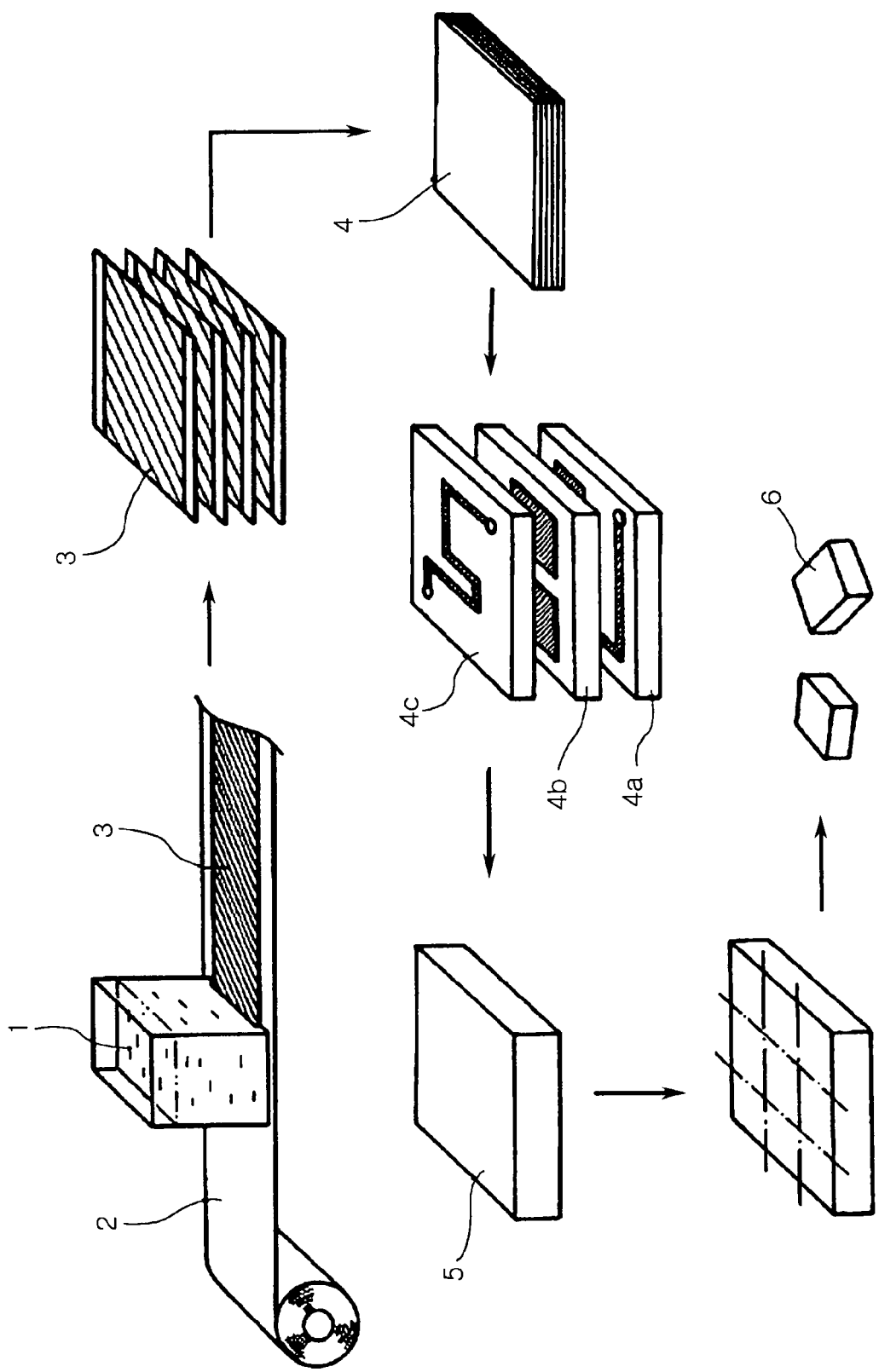
FIG. 1 is a diagram illustrating a general low temperature cofired ceramic (LTCC) process.
Figure 2:
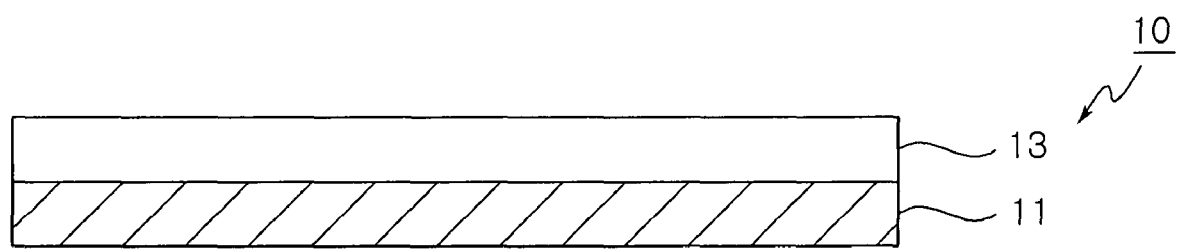
FIG. 2 is a cross-sectional diagram illustrating a ceramic sheet product according to an exemplary embodiment of the present invention.

FIG. 2 is a cross-sectional diagram illustrating a ceramic sheet product according to an exemplary embodiment of the present invention.

Referring to FIG. 2, the ceramic sheet product 10 includes a binder layer 11 and a ceramic green sheet 13.

The binder layer 11 is obtained by applying a binder solution, prepared by mixing a binder resin in a solvent, on a plastic film (not shown) and drying the binder solution.

The binder resin may be one selected from a group consisting of a vinyl resin such as polyvinyl alcohol, polyvinyl butyral and polyvinyl chloride, a cellulose resin such as methyl cellulose, ethylcellulose and hydroxyethyl cellulose, and an acrylic resin such as polyacrylate esters and polymethyl methacrylate (PMMA). In addition, the binder resin may employ an aqueous binder resin and any common-use binder resin usable for processing ceramic sheet products.

The solvent may be one selected from methyl ethyl ketone, ethyl alcohol, isopropyl alcohol, toluene, diethyl ether, trichloro ethylene, methanol and a mixture thereof. However, the solvent is not limited thereto and may employ any common-use solvent capable of dissolving the binder resin.

In the binder layer 11, a mixing ratio of the binder resin to the solvent may be 5 wt %: 95 wt % to 10 wt %:90 wt %. In this case, when a proportion of the binder resin is too small, it is impossible to form a binder layer after drying the binder solution. Therefore, the proportion of the binder resin should be maintained at a lower limit of 5 wt % or more. Also if the proportion of the solvent is insufficient, the binder resin is not dissolved, rendering it impossible to form the binder layer. Therefore, the proportion of the solvent should be maintained at an upper limit of 90 wt %.

In an embodiment of the present invention, the solvent may employ a mixture solvent of toluene and ethanol. A mixing ratio of the toluene and ethanol may be 32 wt %:68 wt %.

However, the binder layer is substantially formed of only the binder resin after it is dried, and thus not limited to the composition ratios described above.

The ceramic green sheet 13 is formed by applying and drying a ceramic slurry on the binder layer 11.

The ceramic slurry is prepared by mixing a mixture of a ceramic powder and a binder resin in a solvent. In this case, since the binder layer 11 formed under the ceramic green sheet 13 sustains the ceramic green sheet 13 and increases stackability of the ceramic green sheet 13, a minimal amount of the binder resin may be added to the green sheet 13. This decreases the viscosity of the ceramic slurry and significantly increases a packing ratio of the ceramic powder.

As a result, a ceramic green sheet with a very high packing density is obtained. The ceramic green sheet may have a packing ratio of 75% or more, and particularly 85% or more.

The mixture may include 90 to 99.5 wt % of the ceramic powder and 0.5 to 10 wt % of the binder resin with respect to a total weight thereof, and may also include an additive. In this case, the additive may be a dispersing agent.

Further, the mixture may include 95 to 99 wt % of the ceramic powder and 1 to 5 wt % of the binder resin with respect to a total weight thereof, and may also include an additive. In this case, when an additive is included, the binder resin may be 0.7 to 1.5 wt %.

In this embodiment, the proportions of the binder resin and the additive are limited to a degree maintaining bonding between the particles of the powder, which allows formation of the green sheet.

Figure 3:
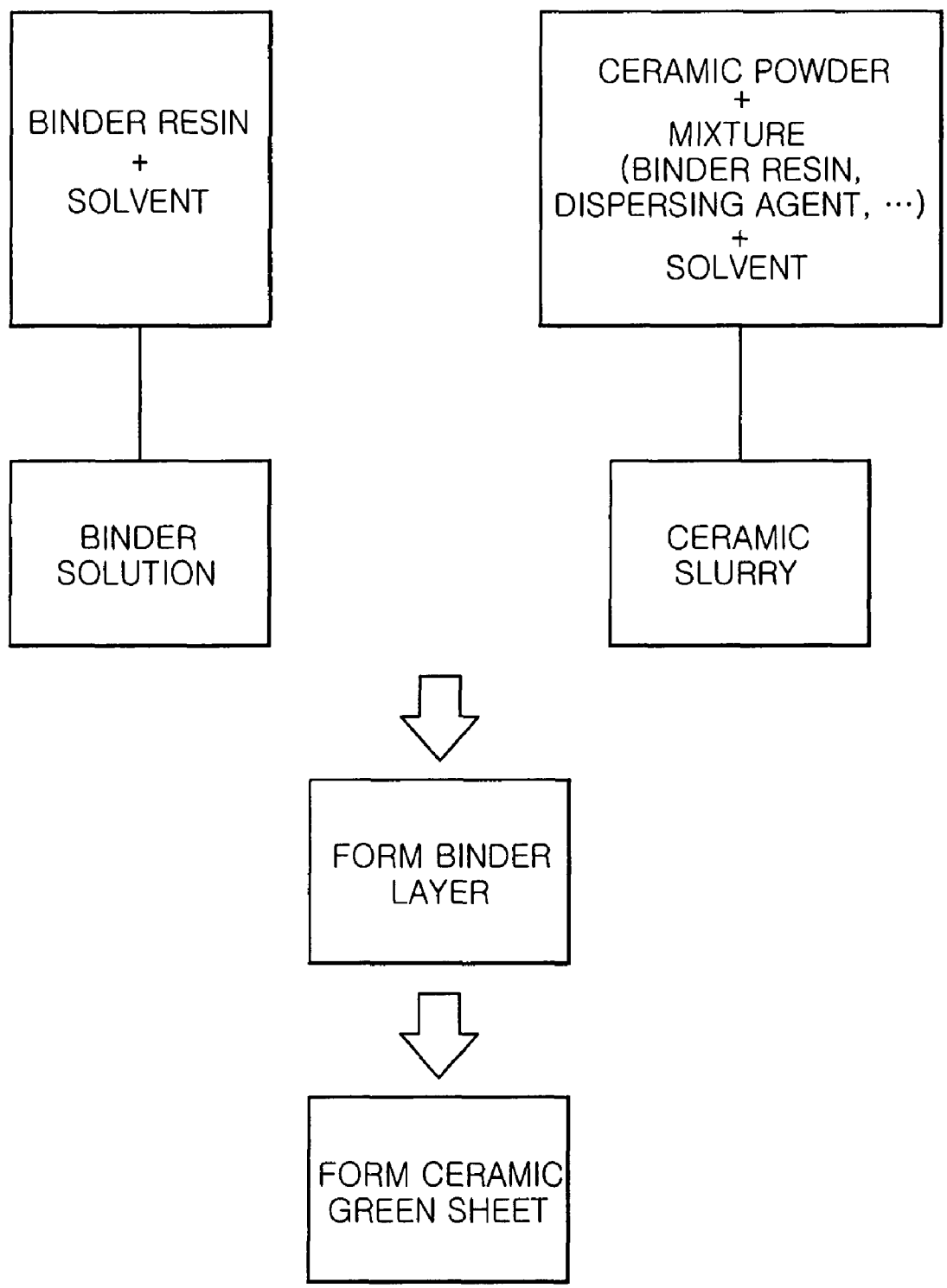
FIG. 3 is a flowchart illustrating a process of manufacturing a ceramic sheet product according to an exemplary embodiment of the present invention.

FIG. 3 is a flowchart illustrating a process of manufacturing the ceramic sheet product, according to an embodiment of the present invention, including forming a binder layer by applying a binder solution, prepared by mixing a binder resin and a solvent, on a film and drying the binder solution; and forming a ceramic green sheet by applying and drying a ceramic slurry on the binder layer.

The binder solution and the ceramic slurry are prepared separately, and different from the conventional art, a minimal amount of binder resin is used in the ceramic slurry, which significantly improves dispersibility of substances in the slurry and decreases the viscosity of the slurry, thereby considerably increasing a powder fraction in the ceramic slurry. That is, separate preparation of the binder solution, which has high viscosity, allows improved dispersibility of substances in both of the binder solution and the ceramic slurry.

The ceramic green sheet is formed on the binder layer by the conventional method. However, since the entire lower portion is the binder layer, uniform inter-layer bonding may be formed in a short time in a later process.

Therefore, as described above, even if a small amount of binder is used to form the ceramic green sheet, it is possible to form strong inter-layer bonding, with substantially no pores formed after binder burnout, thereby improving sinterability. In particular, since the ceramic green sheet has a very large powder fraction, the stacked structure has a high density without pores, which in turn decreases a magnitude of stress generated from the shrinkage (see FIGS. 5 to 8).

The plastic film is removed from the binder layer after the ceramic green sheet is formed.

Figure 4:
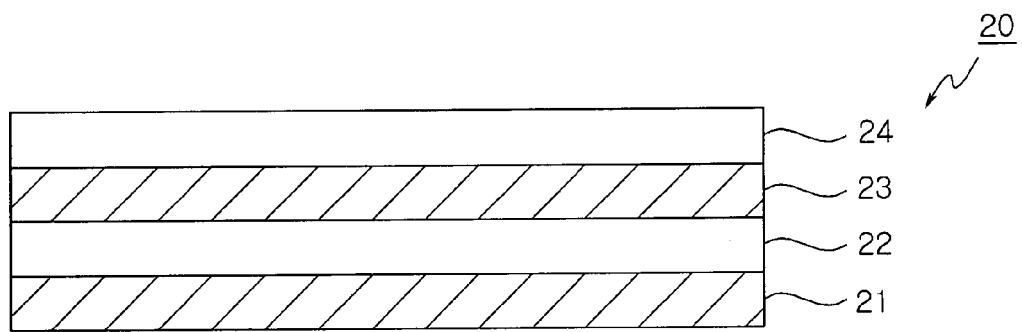
FIG. 4 is a cross-sectional diagram illustrating a multi-layer ceramic sheet product according to an exemplary embodiment of the present invention.

In the meantime, FIG. 4 is a cross-sectional diagram illustrating a multi-layer ceramic sheet product manufactured according to an exemplary embodiment of the present invention. The multi-layer ceramic sheet product 20 is obtained by stacking first and second binder layers 21 and 23 between a plurality of ceramic green sheets, i.e., first and second ceramic green sheets 22 and 24 by repeating forming the binder layer and forming the ceramic green sheet on the binder layer as shown in FIG. 3 and firing a resultant stacked structure. In this case, the first and second binder layers 21 and 23 are removed by a later process of heat treatment at a high temperature.

Of course, the multi-layer ceramic sheet product 20 may also be obtained by separately manufacturing the first binder layer 21 with the first ceramic green sheet 22 and the second binder layer 23 with the second green sheet 24, respectively, and stacking them. The multi-layer ceramic sheet product 20 may be applied to manufacturing of stacked electronic components.

EXAMPLE

FIGS. 5 to 8 are graphs illustrating characteristics of the ceramic green sheet manufactured according to an exemplary embodiment of the present invention. In this case, the binder layer is formed under the ceramic green sheet.

The respective ceramic green sheets compared in the following experiment were manufactured by ceramic slurries having composition ratios as shown in Table 1, in which the composition ratios are expressed in weight ratios. Each of the green sheets was measured in its density, inter-layer bonding strength, shrinkage, and bending strength at respective stages of the manufacturing process.

TABLE 1

| Substance | | Conventional sample | Inventive sample 1 | Inventive sample 2 |
|---|---|---|---|---|
| Ceramic powder | $Al_2O_3$ | 37.23 | 41.35 | 42.15 |
| | Glass | 49.35 | 55.33 | 55.89 |
| Binder resin | | 12.98 | 1.95 | 0.98 |
| Dispersing agent | | 0.44 | 0.97 | 0.98 |

Referring to Table 1, the ceramic green sheet of the conventional sample, according to the conventional art, was manufactured by using a ceramic slurry prepared by mixing a ceramic powder of $Al_2O_3$(37.23) and glass (49.35) and a binder resin (12.98) in a solvent. In this case, the solvent may employ a mixture solvent of toluene and ethanol, and for example, a mixing ratio of toluene and ethanol may be 19.94 wt %:13.29 wt %.

The ceramic green sheet of the inventive sample 1, according to the present invention, was manufactured by using a ceramic slurry prepared by mixing a ceramic powder of $Al_2O_3$ (41.35) and glass (55.33) and a binder resin (1.95) in a solvent. In this case, the solvent may employ a mixture solvent of toluene and ethanol, as in the conventional art, and for example, a mixing ratio of the toluene and ethanol may be 10.41 wt %: 8.14 wt %.

In addition, the ceramic green sheet of the inventive sample 2, according to the present invention, was manufactured by using a ceramic slurry prepared by mixing a ceramic powder of $Al_2O_3$ (42.15) and glass (55.89) and a binder resin (0.98) in a solvent. In this case, the solvent may employ a mixture solvent with toluene and ethanol, and for example, a mixing ratio of the toluene and ethanol may be 10.56 wt %: 7.64 wt %.

Figure 5:
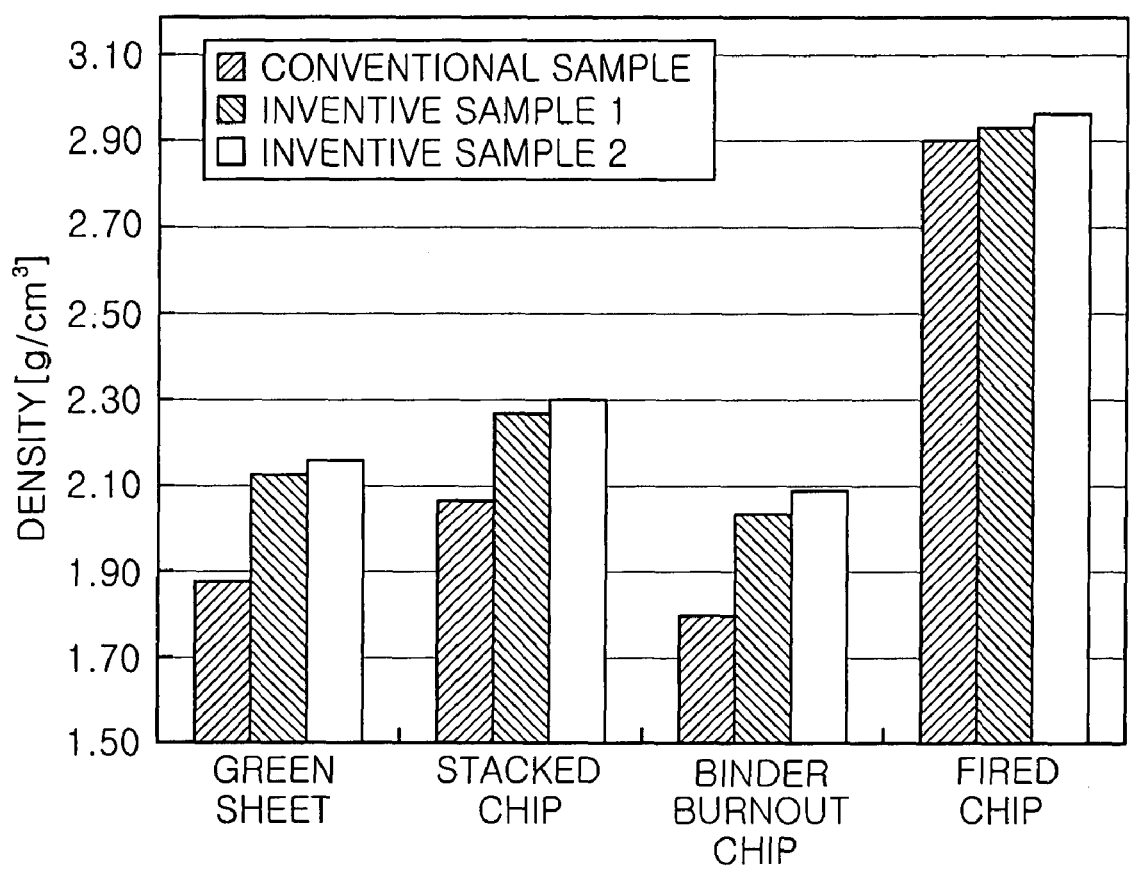
FIGS. 5 through 8 are graphs illustrating characteristics of the ceramic green sheet product manufactured according to an exemplary embodiment of the present invention.

Referring to FIG. 5, the inventive samples 1 and 2 according to the present invention, exhibited higher densities at the respective stages, i.e., stacking, binder burnout and firing stages, than the conventional sample, as shown in Table 2 below.

TABLE 2

| Density at respective stages | | | |
|---|---|---|---|
| | Conventional sample | Inventive sample 1 | Inventive sample 2 |
| Green sheet | 1.88 | 2.14 | 2.19 |
| Stacked chip | 2.05 | 2.26 | 2.29 |
| Baked out chip | 1.80 | 1.99 | 2.08 |
| Fired chip | 2.89 | 2.93 | 2.97 |

That is, since the binder layer under the ceramic green sheet sustains the green sheet and increases stackability of the green sheet, a smaller amount of the binder may be used in the green sheet. This increases a ceramic fraction and thus increases the density of the green sheet, which in turn prevents pores and increases the density of the fired structure.

As a result, a ceramic green sheet with a very high powder packing ratio is obtained, and the ceramic green sheet may have a packing ratio of 75% or more, according to the present invention.

Figure 6:
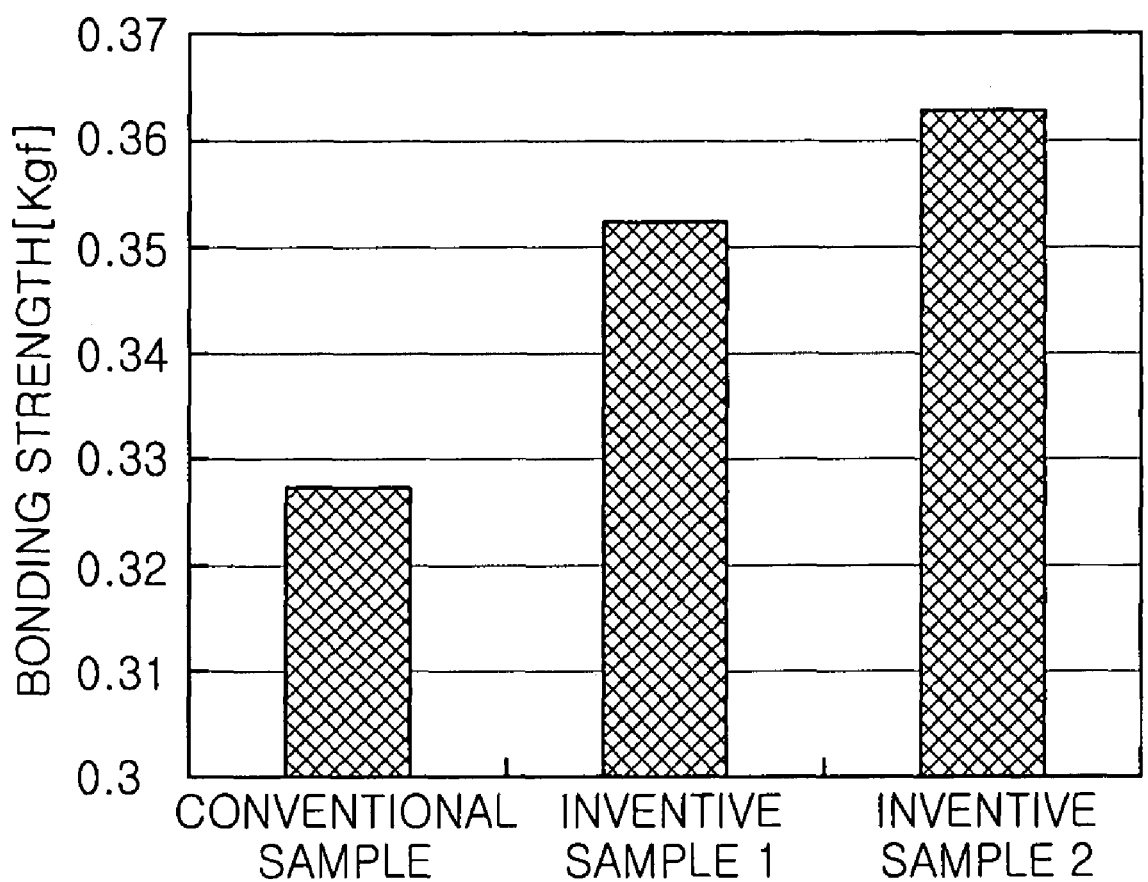

Referring to FIG. 6, the ceramic green sheet of the conventional sample exhibited an inter-layer bonding strength of 0.3275, whereas the ceramic green sheets of inventive samples 1 and 2 exhibited superior inter-layer bonding strengths of 0.3521 and 0.3632, respectively. That is, according to the present invention, since the binder layer functions as an adhesive for bonding the layers to significantly improve stackability, the inventive samples yielded higher bonding strengths than the conventional sheet, with only 1/10 of a conventional amount of binder.

Figure 7:
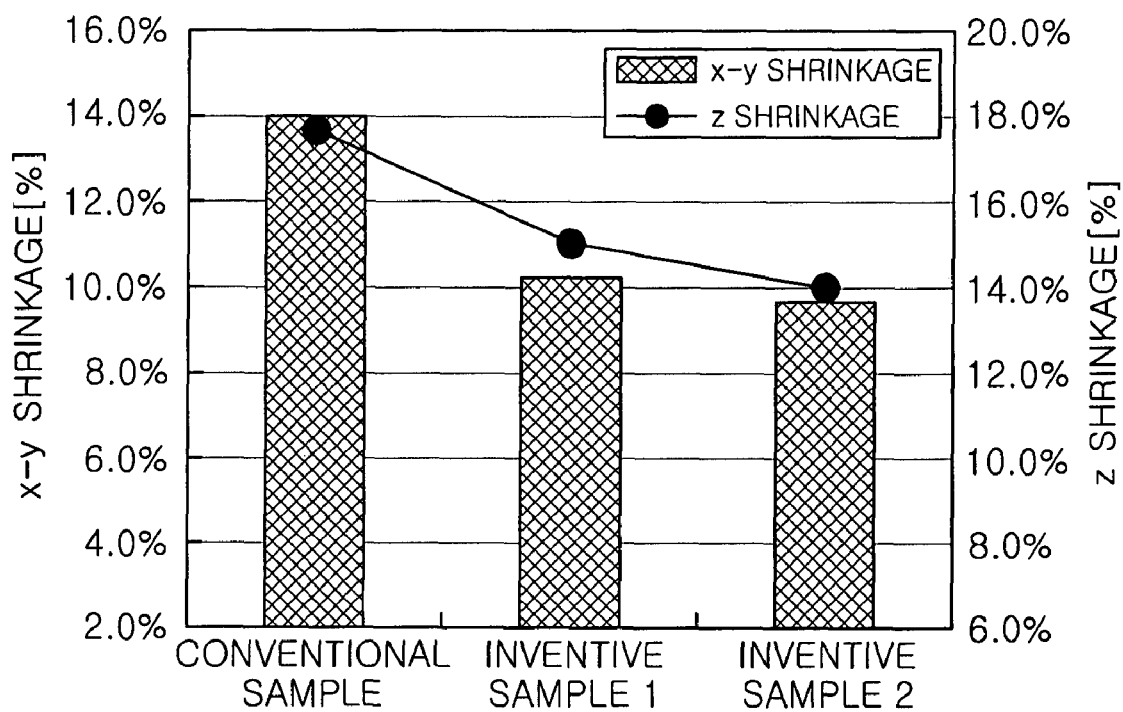

FIG. 7 is a graph illustrating shrinkage, in which each of the ceramic green sheets of the inventive samples 1 and 2 exhibited a very large powder fraction compared to the conventional sample, which results in the high density of the stacked structure and prevents pores. This allows the same firing effects even with little shrinkage.

Figure 8:
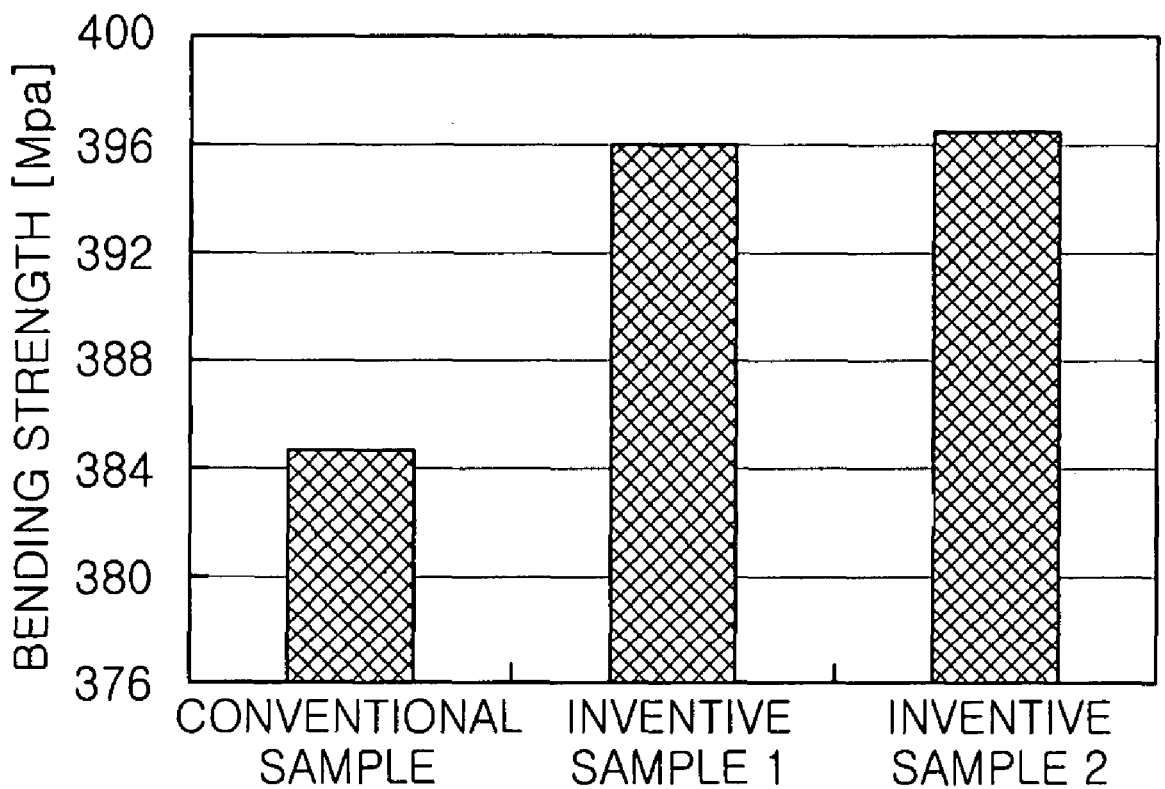

In addition, with reference to FIG. 8, each of the green sheets of the inventive samples 1 and 2 according to the present invention exhibited an increased bending strength by the improved stacked structure due to the increased density, as compared to the conventional sample of green sheet.

The present invention as set forth above provides the following effects.

First, the dispersibility of the substances in the ceramic slurry and the viscosity of the ceramic slurry are significantly enhanced with a minimal amount of high polymer binder in the ceramic slurry, which in turn increases the ceramic powder fraction. The resultant high density of green sheet leads to a low pore ratio, a low volume shrinkage and a high density.

Second, even if the ceramic green sheet is formed in a small thickness, the underlying binder layer may be adjusted in its thickness, thereby manufacturing a thin film green sheet easy to handle, without changing an effective thickness after firing.

Third, the binder layer uniformly distributed under the green sheet allows a high inter-layer bonding strength, which is not sensitive to conditions during stacking, thereby preventing defects such as separation of layers.

Fourth, since the binder solution and the ceramic slurry are manufactured separately, optimal solvents may be employed for both of the binder and the ceramic slurry, respectively.

While the present invention has been shown and described in connection with the exemplary embodiments, it will be apparent to those skilled in the art that modifications and variations may be made without departing from the spirit and scope of the invention as defined by the appended claims.

What is claimed is:

1. A ceramic sheet product comprising:
a plurality of binder layers formed of binder resins; and
a plurality of ceramic green sheets, comprising 95 to 99 wt % of ceramic powder and 1 to 5 wt % of binder resin with respect to a total weight thereof, and having a packing ratio of 75% or more, formed on the plurality of binder layers respectively,
wherein the binder layers and the ceramic green sheets are stacked alternately and the binder layers form strong inter-layer bonding connections with adjacent ceramic green sheets.

2. The ceramic sheet product of claim 1, wherein the binder resin is at least one selected from a group consisting of a vinyl resin, a cellulose resin and an acrylic resin.

3. A method of manufacturing a ceramic sheet product, the method comprising:

forming a binder layer by applying a binder solution, in which a binder resin and a solvent are mixed, on a plastic film and drying the binder solution;

forming a ceramic green sheet having a packing ratio of 75% or more by applying and drying a ceramic slurry comprising 95 to 99 wt % of ceramic powder and 1 to 5 wt % of binder resin with respect to a total weight thereof on the binder layer, and stacking the binder layer and the ceramic green sheet alternately by repeating forming the binder layer and forming the ceramic green sheet on the binder layer.

4. The method of claim 3, further comprising removing the plastic film from the binder layer, after forming a ceramic green sheet.

5. The method of claim 3, wherein the binder resin is at least one selected from a group consisting of a vinyl resin, a cellulose resin and an acrylic resin.

* * * * *